United States Patent [19]

Holt et al.

[11] Patent Number: 5,027,533
[45] Date of Patent: Jul. 2, 1991

[54] VIBRATORY SHELLFISH HARVESTERS AND METHODS

[75] Inventors: John K. Holt; Roger L. Creswell, both of Ft. Pierce, Fla.

[73] Assignee: Harbor Branch Oceanographic Institution Inc., Ft. Pierce, Fla.

[21] Appl. No.: 463,474

[22] Filed: Jan. 11, 1990

[51] Int. Cl.$^5$ .............................................. E02F 5/00
[52] U.S. Cl. ................................ 37/55; 37/DIG. 7; 37/DIG. 18; 172/40; 172/393
[58] Field of Search .............. 37/55, 119, DIG. 18; 172/40, 393; 37/DIG. 7

[56] References Cited

U.S. PATENT DOCUMENTS

| | | | |
|---|---|---|---|
| 3,948,329 | 4/1976 | Cummings | 37/DIG. 18 |
| 4,112,602 | 9/1978 | Kato et al. | 37/55 |
| 4,425,723 | 1/1984 | Erlandsen | 37/55 |
| 4,828,690 | 5/1989 | Montez | 37/119 X |
| 4,896,730 | 1/1990 | Jarrett et al. | 172/40 |

FOREIGN PATENT DOCUMENTS

| | | | |
|---|---|---|---|
| 1022404 | 1/1958 | Fed. Rep. of Germany | 172/40 |
| 1176169 | 8/1964 | Fed. Rep. of Germany | 172/40 |
| 19170 | 6/1928 | Netherlands | 172/393 |

Primary Examiner—Dennis L. Taylor
Assistant Examiner—Arlen L. Olsen
Attorney, Agent, or Firm—Carroll F. Palmer

[57] ABSTRACT

Shellfish harvesting devices including a frame to move over the submarine surface of a shellfish growing substrate and a plurality of tines extending down from it for penetration into the substrate, are improved by addition of a vibrator to impart a vibratory motion to the tines, but not appreciably vibrate other parts of the frame, e.g., runners. The harvesting of clams or like bivalves with the tines vibrating while being pulled through the substrate mitigates environmental damage to the shellfish growing area and reduces the energy required to pull the devices forward on the substrate.

12 Claims, 3 Drawing Sheets

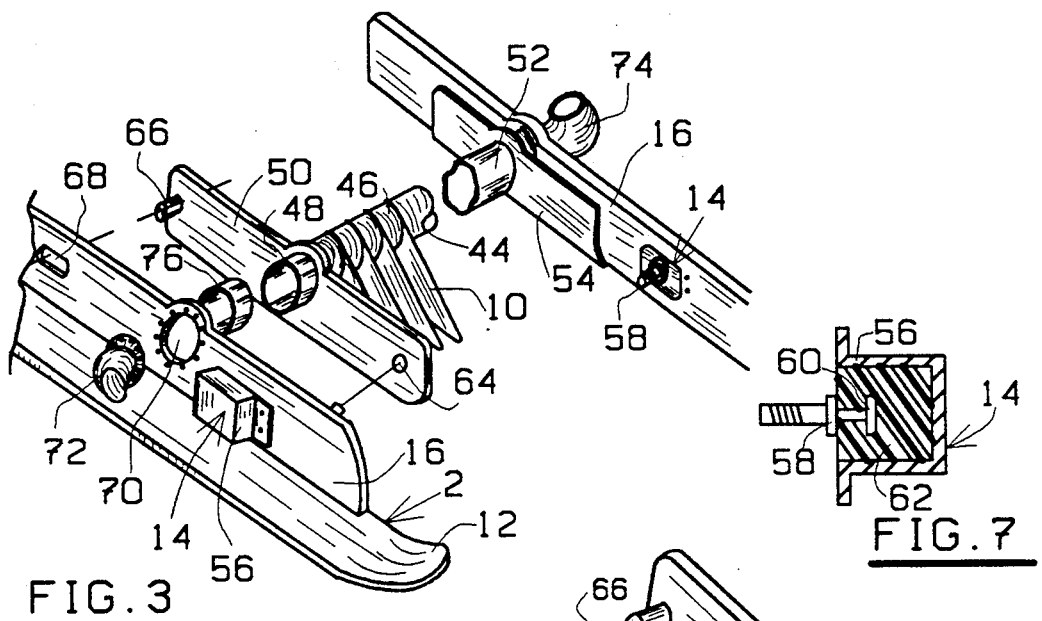
FIG. 3
FIG. 7
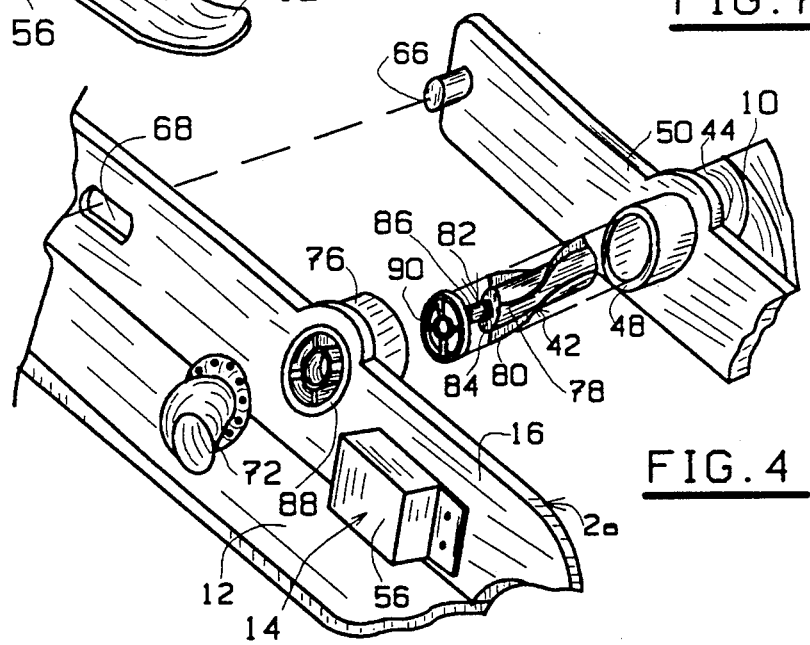
FIG. 4
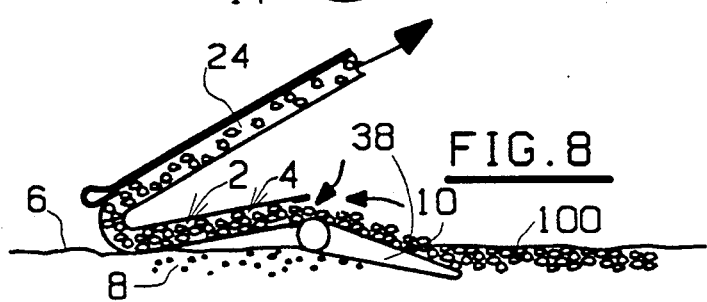
FIG. 8

VIBRATORY SHELLFISH HARVESTERS AND METHODS

BACKGROUND OF THE INVENTION

1. Field of the Invention

This application relates to devices and methods for harvesting of marine bivalve mollusks. More particularly it concerns devices and methods for the harvesting of clams with minimum damage to the environment.

2. Description of the Prior Art

Submarine farming is an extremely complicated undertaking because the marine environment is many times more complex than traditional terra firma agriculture farming. Hence, three major labor intensive phases of such an endeavor, planting (or stocking), nurturing and harvesting must be accomplished with even greater attention paid to the consequences of methodology and equipment design.

The submarine interface between bottom sediment and the water just above it is a very important region of any body of water. Physically this is a result of currents, sediment transport, etc. in the area over a period of time. Grain size, stratification and contour reflect an established balance. Man's alterations result in processes which will seek to re-establish this balance. A change in contour, for example, will mean increased sediment transport in the area, increasing turbidity levels, changes in light transmission characteristics and biological productivity.

It has been established that a delicate chemical balance exists, at least with organic nutrients, between the available nutrients in the water and nutrients trapped in the sediment. This "bank" is important to the long term biological productivity of the area. It is believed that some toxic materials, heavy metals, and other containments are trapped in the sediment, removing them as a hazard to most of the food chain.

Biologically, the bottom interface is the home of a diverse community, containing elements of the entire food chain, from bacteria to predator. The particular area of concern here is the infauna, or animal population living in the sediments just below the interface. Some members of the population are of commercial value, a good example being the hard clam, *Mercenaria mercenaria*.

The clam is a filter-feeding shellfish. This animal, encased in a pair of hard, protective shells, positions itself just below the interface and extends its siphon or "neck" into the water above. Water is pumped through the clam and expelled through a second passage in the siphon. Food, mostly microalgae, is strained from the water and utilized. At the same time, oxygen necessary for respiration is obtained from the pumped water. The clam has no parallel in agriculture. It would constitute a hard-shelled animal, buried like a potato, deriving both its nutritional and respiration needs from breathing air.

While the clam has many natural predators, man is perhaps the most serious. Harvesting of clams in the wild ranges from digging by hand to the use of powerful ships and specialized mechanical equipment. Traditional manual harvest tools include rakes, tongs and the like. Harvesting clams with such tools becomes commercially inefficient because of their inefficiency under conditions of high clam densities. Also with use of such tools, it is difficult to assure that all of the planted area has been fully harvested.

Mechanical harvesting equipment currently available include hydraulic dredges (see U.S. Pat. No. 3,462,858) and suction dredges (see U.S. Pat. No. 3,624,932). However, with such equipment, the substrate is removed and then the shellfish are recovered. This results in undesirable habitat damage.

Another type of shellfish harvesting equipment less destructive to the habitat are sledge-type devices that comprise inclined tines or teeth which penetrate the substrate (see U.S. Pat. Nos. 4,112,602; 4,425,723 & 4,827,635). The present invention relates to this class of shellfish harvesters and provides improvements in the construction and operation thereof.

For example, the amount of energy required to drag sledge-type devices of the prior art through dense clam beds is formidable thereby limiting the size of the rake that can be incorporated in the sledge. Also, any propeller driven craft requires considerable thrust to pull such sledge devices forward. In shallow water, this can re-suspend bottom sediments and increase turbidity. The present invention makes it possible to reduce the drag created by a given size rake contained in sledge-type shellfish harvesting devices.

All of the prior methods and equipment, including digging by hand, accomplish their goal by disturbing, and in most cases removing, much more sediment than surrounds the clam itself.

If one could grow a clam with a string attached, and harvest was accomplished by pulling on that string, the bottom interface would be disturbed, but the disturbance would be limited to that which was absolutely necessary to remove the clam. While this is not practical, the harvest of infauna should be pursued in that light in view of the extreme importance and delicacy of the region in which they exist.

The culture of shellfish as a "crop" compounds the problem, and again, the hard clam will serve as a good example. The density of clams in the wild may be several per square foot. As in agriculture, the farmer needs maximum yield to succeed in business, so juvenile clams ("seed") are planted in densities up to 100 per square foot, the "beds" are covered with nets to discourage natural predators while allowing water circulation. These nets are cleaned and changed as necessary, much as the dry land farmer protects his crop from weeds, birds, and other factors which constitute competition for his crop. While the farmer (or rancher) of the land is equipped for efficient harvest, the aquatic farmer harvesting infaunal organisms is not. The equipment available does not reflect the complexities of this new environment. The equivalent may be likened to a potato farmer harvesting his fields with a bulldozer, then separating the potatoes from the pile of dirt.

Harvest size clams, planted in the densities described, form a "bed" similar to a cobblestone road bed. Harvesting by hand is difficult due to the density. The "ideal density" which will produce a sustainable harvest over a long period of time has not been determined. Meanwhile, an environmentally benign method of harvesting and novel equipment for carrying out the method has been the focus of this present invention.

OBJECTS

A principal object of the invention is the provision of apparatus capable of harvesting marine bivalve mollusks more efficiently than related prior known equipment.

A further object is the provision of such shellfish harvesters that cause less environmental damage than even traditional manual harvesting tools, when tested on a per-clam basis.

Another object is the provision of new methods for harvesting clams and like shellfish with minimal environmental damage.

Yet another object is the provision of new sledge-type apparatus and methods for harvesting clams and like shellfish that reduces sledge drag thereby increasing the potential size of the rake and lowering energy requirements to move the sledge along the submarine surface.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

In light of the foregoing background explanation the "clam on a string" viewpoint has been used in the development of methodology for infaunal harvest. The task is to provide a method and the equipment to efficiently harvest a crop living in the substrate below the sediment/water interface beneath a body of water. In accomplishing this, there must be minimum disturbance of the sediment, minimum release of fine particles which might increase turbidity in the water, a minimum impact on small and immature creatures, and no mortality or damage to the harvested crop.

A rake-like device was chosen as the basis for the improved device, although perhaps for slightly different reasons than conventional gear. A rake is generally regarded as a row of parallel or staggered tines which is pulled through the sediment at some acute angle. It is pulled with sufficient force to cause obstructions, such as clams, to move up the angled tines to the surface where they are then harvested. Our research has shown that such a device, operated in that manner, causes great quantities of sediment to be raised also, due to cohesive forces. The range of sediments in which clams are found changes the amount of the substrate excavated, but the fact remains that the clams do not live in sediments which lack some cohesive or "sticky" quality. Even rocking the tines back and forth (changing the acute angle) does not solve the problem. This, in effect, is the action used with the manual clam rake. The accumulated sediment is washed from the rake and accumulated clams in the water column before the harvest is brought to the surface.

With the foregoing factors in mind, the objects of the invention are, in part, accomplished by the provision, in shellfish harvesting devices comprising a frame having means to move over the submarine surface of a shellfish growing substrate and a plurality of tines extending downward therefrom for penetration into the substrate, of the improvement which comprises vibrator means to impart a vibratory motion to the tines. In one preferred embodiment, the frame is a sledge having a pair of runners designed to slide over the submarine surface and includes shock absorber means to mitigate vibration of the runners by the vibrator means.

As an alternative to the active vibratory rake-like device being carried on a frame equipped with sled-like runners to maintain its design configuration with respect to the bottom, the device can be carried on wheels to ride on rail-like borders along the margins of a planted area on the submarine bottom.

The essential vibratory motion is applied to the tines causing a fluidization of the sediment surrounding the tines. As the pathway immediately ahead of an individual tine is fluidized (that is, the sediment grains pushed aside and replaced with interstitial water), the tine is free to move slightly, coming in contact with the next sediment grains, which are then pushed aside, etc. As the tine proceeds, the space is closed behind it by the sediment reclaiming the void. An object larger than the space between the tines will be forced upward, but not by brute force. Some of the micromotion will be transmitted to the shell, helping to fluidize the path to the surface, bit by bit. A constant tension, horizontal pull on the device insures that forward motion will progress as conditions permit.

The frequency and magnitude of the vibration will depend on varying factors. Some of the obvious variables are sediment composition and cohesive strength (i.e. damping effect), depth of crop (amount of sediment to be penetrated), density of crop (amount of energy transmitted to objects to be raised to the surface). Some of the less obvious include shell strength (this will vary with the crop) and effect on the bivalve (an intact shell full of lifeless jelly is not a successful harvest). A mature line of equipment will consist of models specific for crop and bottom type.

In preferred embodiments, the vibrator means comprises a turbine-like device that vibrates the tines at a rate of between about 1 and 200 times per second and the amplitude of such vibrations is between about 1 and 10 millimeters. Advantageously, the vibratory motion is vertically oriented, i.e., has a major vector oriented 80–90° and a minor vector oriented 0–10° relative to the plane of surface of the bivalve substrate being harvested.

There are two ways of producing the vibratory motion in the tines from the rotary motion of a turbine-like device. If an off-center weight is placed in the turbine wheel itself, a vibratory force is produced and transmitted through the bearings and housing to the attached tines. The frequency will be constant, depending only on water flow, but the amplitude of the resulting motion will vary depending on the loading (damping) on the tines.

Alternatively, when the rotating turbine wheel is mechanically coupled through an eccentric to the frame, the amplitude remains constant while the frequency varies with the loading on the tines. Both of these device arrangements are useful as automatic regulators in some circumstances.

In a preferred embodiment, the vibrator means comprises a rotatable, off-center mass and a hydraulic motor for rotating the mass and the shock absorber means comprises rubber mounts for the runners.

The exhaust water from the rotary device may be diverted to an enclosed collecting device resembling a flattened funnel. Its purpose is to wash the harvested product back to the apex where a large diameter suction hose delivers the shellfish to a surface vessel.

In commercial use, any harvest equipment will require some means to collect the harvest and transport it to the consumer. Therefore, it is assumed that the new devices will be used in conjunction with a vessel of some sort. This vessel can therefore not only store the harvest, but supply the energy for pulling the equipment across the bottom and powering the active vibratory portion on the bottom. The transmission of power to the active device on the bottom presents an additional set of problems.

Conventional power transmission technology is available in the mechanical, electrical and hydraulic fields. From the viewpoint of a waterborne harvesting vessel, all of the conventional designs have serious drawbacks. A design which would be adaptable to the varying depths and conditions would have to be extremely flexible and isolated from the corrosive water medium.

Mechanical transmission would be expensive to build and maintain, although it can be done. Electrical power transmission is quite common, is controllable and flexible. However, it is conceivably quite hazardous to the crew when used in the marine environment and requires isolation from the water, again expensive to build and maintain. Conventional closed circuit hydraulics is the most appealing for this service. However, conventional hydraulic fluids are toxic and any spill or accident would be deleterious to the environment. Advantageously, the new devices of the invention employ an unused variation of hydraulic technology using low pressure (less than 100 PSI) water in an open circuit.

Water in which the tending vessel floats is pumped through flexible hose to the active equipment where it turns a low pressure turbine to produce mechanical power for the vibrating action. A turbine-like device is necessary because the water being pumped from the surface will not be clean and sediment free. Close tolerances will be difficult to maintain, so a free flowing, self cleaning device is employed.

Objects of the invention are further accomplished by the provision of a method of harvesting shellfish from a submarine shellfish growing substrate which comprises (A) providing a frame designed to move over the surface of the substrate and a plurality of tines extending downward therefrom, (B) penetrating the tines into the substrate while moving the frame over the surface, and (C) vibrating the tines during such movement of the sledge. In a preferred method, the frame is a sledge that moves on runners and no significant vibration of the runners occurs during the tine vibrating step.

BRIEF DESCRIPTION OF THE DRAWINGS

A more complete understanding of the invention can be obtained by reference to the accompanying drawings in which:

FIG. 3 is an exploded view of a first embodiment of a vibrator unit for devices of the invention.

FIG. 4 is an enlarged view of the first embodiment of vibrator unit.

FIG. 7 is a sectional view of a shock absorber means for the devices of the invention.

FIG. 8 is a diagrammatic view of a device of the invention in operation harvesting clams from a submarine substrate.

DESCRIPTION OF THE PREFERRED EMBODIMENTS

Figure 1:
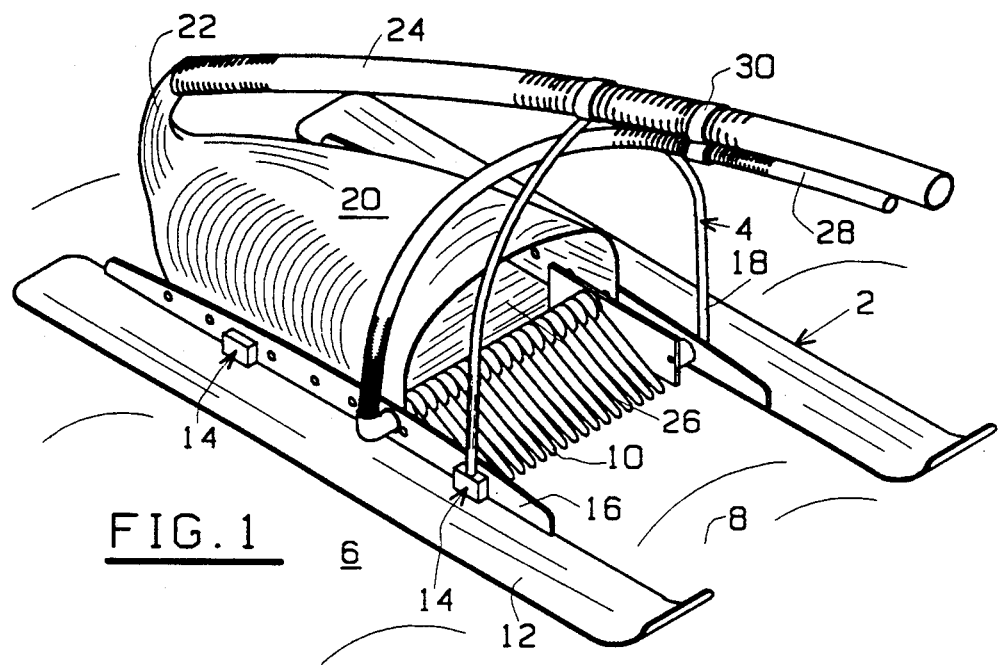
FIG. 1 is a perspective view of a first embodiment of a shellfish harvesting device of the invention.
Figure 2:
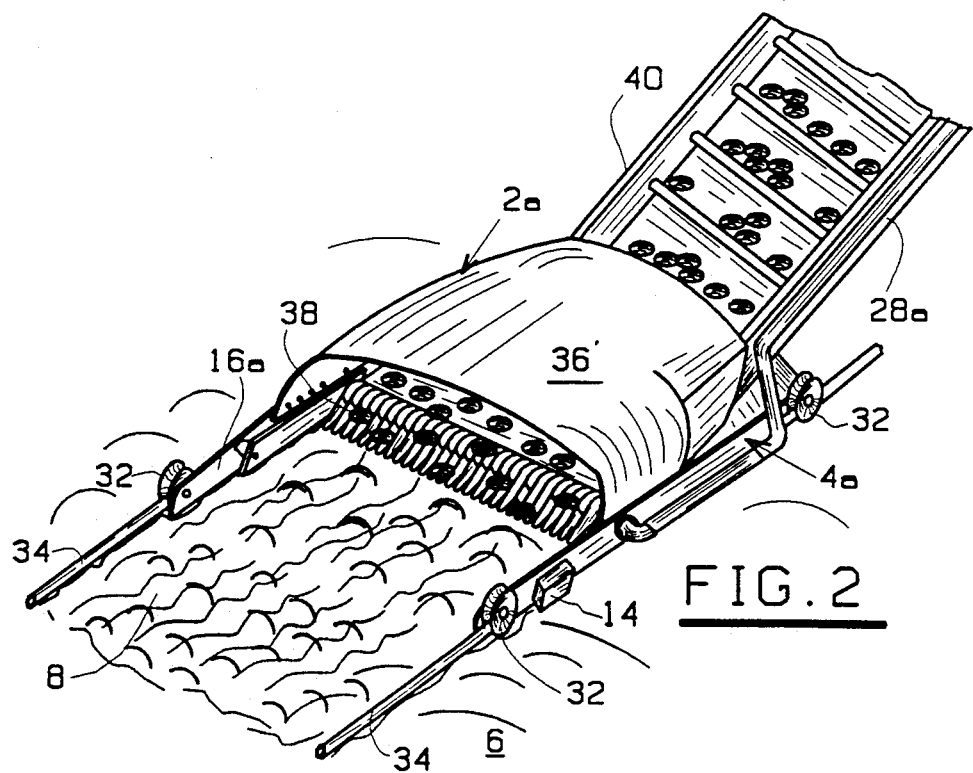
FIG. 2 is a perspective view of a second embodiment of a shellfish harvesting device of the invention.

Referring in detail to the drawings, the subtidal shellfish harvesting device 2 basically comprises a frame 4 designed to move over the submarine surface 6 of a shellfish growing substrate 8 and a plurality of tines 10 extending downward therefrom for penetration into the substrate 8.

The frame 4 has a pair of runners 12 fixed thereto by shock absorber means 14 and includes vertical panels 16 and an arch member 18.

A funnel unit 20 is bolted to the panels 16 and its exhaust end 22 connects to the exhaust hose 24 to transport to the surface vessel (not shown) clams that are raised by the tines 10 onto the collection plate 26.

A hydraulic pressure hose 28 is fixed by spaced-apart clamps 30 to the hose 24 to reach the surface vessel for connection to a hydraulic pressure source (not shown).

The second embodiment of the subtidal shellfish harvesting device 2a basically comprises a frame 4a designed to move over the submarine surface 6 of a shellfish growing substrate 8 and a plurality of tines 10 extending downward therefrom for penetration into the substrate 8.

The frame 4a has vertical panels 16a fixed thereto by shock absorber means 14 and these panels carry concave wheels 32 that roll along the rails 34 positioned on the submarine surface 6.

A hood 36 is provided over the tines 10 to confine the clams 38 harvested by the tines 10 from the substrate 8 and guide them onto the belt conveyor 40 which delivers the clams 38 to the surface vessel (not shown).

Also, the device 2a includes hydraulic pressure hose 28a that connects at its upper end (not shown) to a hydraulic pressure source (not shown) carried on the surface vessel.

FIGS. 3 & 4 show a first embodiment of a vibratory means 42 for vibration of the tines 10 of the device 2. The means 42 comprises a tubular housing 44 that extends across the width of device 2 and to which the tines 10 are fixed at their rear ends 46. The starboard end 48 of housing 44 is rigidly fixed to a first mounting brace 50 and its port end 52 is similarly fixed to a second mounting brace 54.

With reference to FIG. 8, the shock absorber means 14 comprises a housing 56 and a bolt 58, the head 60 of which is encased in an elastomer pad 62 molded into the housing 56. The braces 50 & 54 have a bore 64 in their forward ends through which the bolts 58 of means 14 extend to partially mount the housing 44 on the panels 16. This shock mount allows limited motion of the front ends of the braces 50 & 54 in any direction.

The rear ends of the braces 50 & 54 carry pins 66 which extend into the elliptical slots 68 in the panels 16 to complete the mounting of the housing 44 on the panels 16. This mass coupling allows movement of the braces 50 & 54 relative to the panels 16 in the fore/aft plane only.

The starboard panel 16 includes a bore 70 to which a hose elbow 72 is fastened, e.g., by screws, on the outboard side. As seen in FIG. 1, elbow 72 joins to the hose 28.

The port side of device 2 is similarly fitted with an elbow 74 which can discharge directly into the ambient or be fitted with a hose (not shown) to discharge fluid onto the plate 26 to wash sediment from harvested clams.

The end 48 of housing 44 is fitted with a flexible coupling 76 to make a fluid-tight connection between the end 48 and the elbow 72. Elbow 74 and housing end 52 are similarly connected with a flexible coupling (not shown).

The vibrator means 42 comprises a rotor 78 with integral vanes 80 and a shaft 82 having a concentric portion 84 and an eccentric portion 86. The eccentric portion rotates in the bearing 88 fixed in the bore 70 of starboard panel 16 and the concentric portion 84 rotates in the bearing 90 that is fixed in the lumen of housing 44. The port end of the rotor 78 (not shown) is similarly structures with concentric and eccentric shaft portions and related bearings.

In view of the wearing forces that will be imposed on the bearings 90, the rotor 78 may be made of keyed segments (not shown) with a plurality of such bearings being spaced apart internally along the length of the housing 44 mating with an equal number of concentric shaft portions 84.

Figure 5:
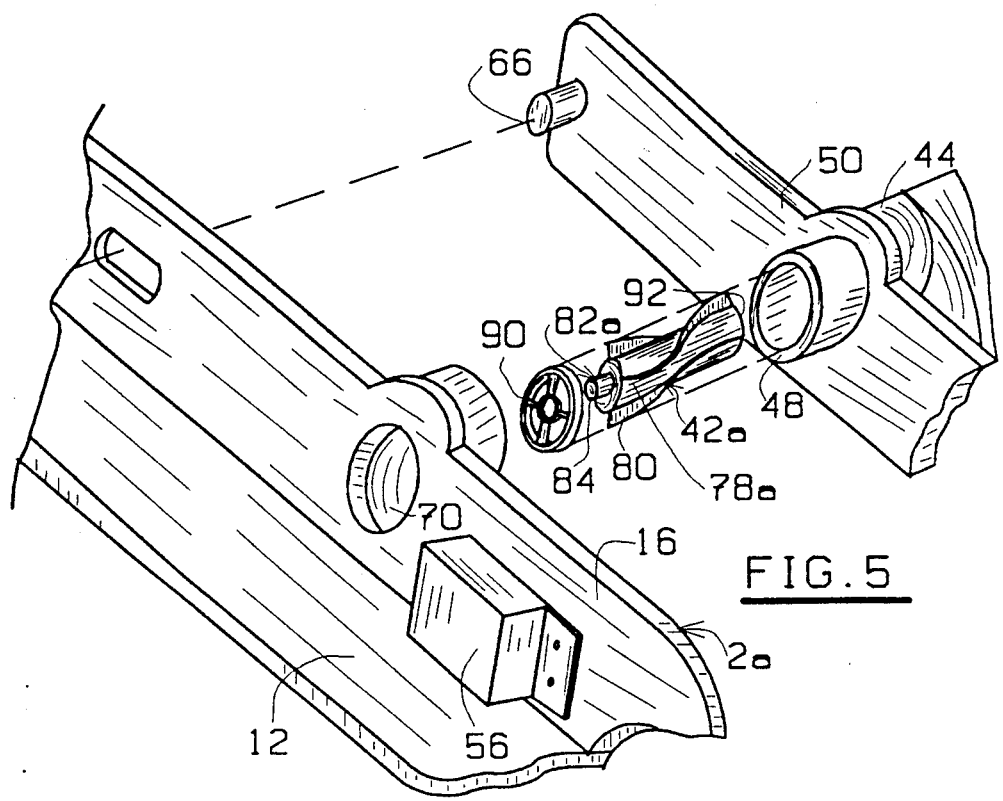
FIG. 5 is an exploded view of a second embodiment of a vibrator unit for devices of the invention.

The vibrator means 42a of device 2a shown in FIG. 5 comprises a rotor 78a, a shaft 82a with only a concentric portion 84, but with an eccentric weight portion 92. In this embodiment, the bearings 90 in which the shafts 82a at each end of the rotor 78a rotate are carried in the lumen of the housing 44. As in the case of vibrator means 42, rotor 78a may be segmented to function with more than two bearings 90.

Figure 6:
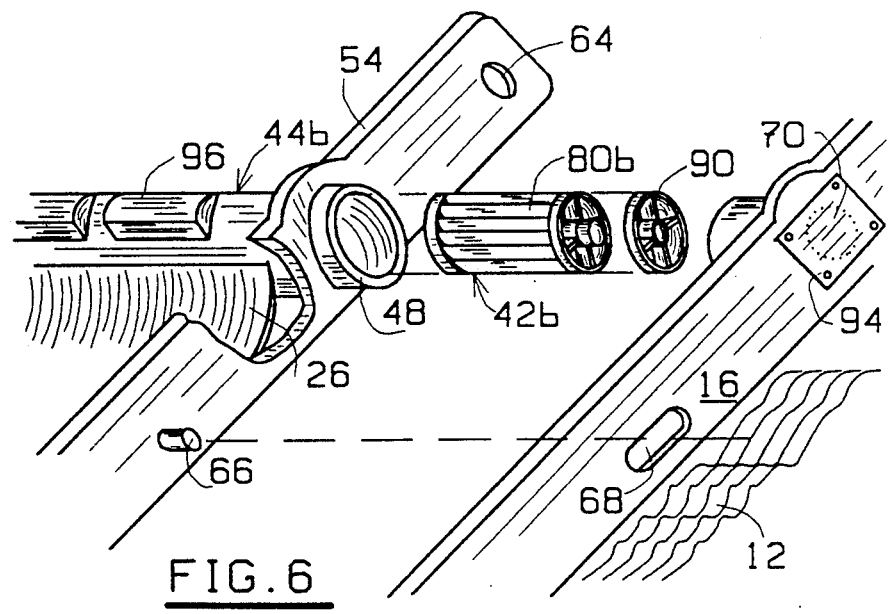
FIG. 6 is an exploded view of a third embodiment of a vibrator unit for devices of the invention.

The vibrator means 42b of device 2b shown in FIG. 6 comprises a rotor 78b and shafts 82a that rotate in bearings 90 fixed in the lumen of the housing 44. The port bore 70 of device 2b is closed by the plate 94 so that water under pressure entering the starboard bore 70 (not shown) of housing 44b is forced to exit the housing via the side outlets 96 to flow over the collector plate 26. Such flow of water will also pass through vanes 82b thereby causing the rotor 42b to rotate in the housing 44b.

Vibratory action can be obtained in means 42b either by use of eccentric shafts as in device 2 or an offset weight rotor as in device 2a. Also, the rotor 42b may be segmented to operate with more than two bearings 90 as previously discussed.

The new methods of clam or like bivalve harvesting are illustrated in a general way in FIG. 8. Thus, the device 2 moves over the surface 6 of said substrate 8 having a plurality of tines 10 extending downward from device frame 4. Such movement can be accomplished in a variety of ways. Typically, it will occur by having a surface vessel pull the device 2, e.g., by applying tension to the exhaust hose 24.

The substrate 8 being harvested will constitute a typical cultured population 100 of clams 38. The tines 10 of device 2 perpetrate the surface 6 of the substrate 8 usually at a depth of about 4-6 inches as frame 4 moves over surface 6. During such movement, the tines 10 are vibrated in accordance with the invention. This produces liquidization of the matrix of the substrate 8 enabling the tines 10 to lift the harvest size clams 38 out of the substrate with a minimum of disturbance to the substrate and, at the same time, permit the undersized claims 102 to remain relatively undisturbed in such substrate.

The embodiments of the invention in which an exclusive property or privilege is claimed are defined as follows:

1. In a subtidal shellfish harvesting device comprising a frame designed to move over the submarine surface of a shellfish growing substrate and a plurality of tines extending downward therefrom for penetration into said substrate, the improvement which comprises in combination therewith vibrator means comprising a hydraulic motor powered by sea water to impart vibratory motion to said tines substantially normal to said submarine surface.

2. The device of claim 1 wherein the amplitude of said tines vibrations is between about 1 and 10 millimeters.

3. In a shellfish harvesting device comprising a sledge having a pair of runners designed to slide over the submarine surface of a shellfish growing substrate and a plurality of tines extending downward form said sledge for penetration into said substrate, the improvement which comprises;
   vibrator means to impart a vibratory motion to said tines substantially normal to said submarine surface comprising a rotatable, off-center mass and a hydraulic motor powered by sea water for rotating said mass and
   shock absorber means to mitigate vibration of said runners by said vibrator means.

4. The device of claim 3 wherein said shock absorber means comprises rubber mounts for said runners.

5. The device of claim 3 wherein said vibrator means vibrates said tines at a rate of between about 1 and 200 times per second.

6. A method of harvesting shellfish from a submarine substrate having shellfish growing beneath the submarine surface thereof which comprises:
   providing a device designed to move over said submarine surface having a plurality of tines extending downward therefrom,
   penetrating said tines into said substrate while moving said frame over said surface, and
   vibrating said tines by vibrator means comprising a hydraulic motor powered by sea water in a plane substantially normal to said submarine surface during said movement of said frame.

7. The method of claim 6 wherein said vibration is at a rate of between about 1 and 200 times per second.

8. The method of claim 7 wherein the amplitude of said tines vibrations is between about 1 and 10 millimeters.

9. A method of harvesting shellfish from a submarine substrate having shellfish growing beneath the submarine surface thereof which comprises:
   providing a sledge having a pair of runners designed to slide over said submarine surface and a plurality of tines extending downward from said sledge,
   penetrating said tines into said substrate while sliding said sledge over said surface, and
   vibrating said tines by vibrator means comprising a hydraulic motor powered by sea water in a plane substantially normal to said submarine surface during said sliding of said sledge.

10. The method of claim 9 wherein no significant vibration of said runners occurs during said tine vibrating step.

11. The method of claim 9 wherein said vibration is at a rate of between about 1 and 200 times per second.

12. The method of claim 11 wherein the amplitude of said tines vibrations is between about 1 and 10 millimeters.

* * * * *